United States Patent
Bhati et al.

(10) Patent No.: US 10,901,573 B2
(45) Date of Patent: Jan. 26, 2021

(54) GENERATING PREDICTIVE ACTION BUTTONS WITHIN A GRAPHICAL USER INTERFACE

(71) Applicant: AIRWATCH LLC, Atlanta, GA (US)

(72) Inventors: Dheeraj Bhati, Bangalore (IN); Ramanandan Nk, Bangalore (IN); Ashish Maan, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 607 days.

(21) Appl. No.: 15/219,316

(22) Filed: Jul. 26, 2016

(65) Prior Publication Data
US 2017/0228107 A1    Aug. 10, 2017

(30) Foreign Application Priority Data
Feb. 5, 2016   (IN) .............................. 201641004196

(51) Int. Cl.
G06F 3/0482 (2013.01)
G06F 3/0489 (2013.01)
G06F 3/0481 (2013.01)
G06F 3/0488 (2013.01)
G06F 9/451 (2018.01)

(52) U.S. Cl.
CPC .......... *G06F 3/0482* (2013.01); *G06F 3/0481* (2013.01); *G06F 3/04886* (2013.01); *G06F 3/04895* (2013.01); *G06F 9/453* (2018.02)

(58) Field of Classification Search
CPC combination set(s) only.
See application file for complete search history.

(56) References Cited

U.S. PATENT DOCUMENTS

| 6,323,884 B1* | 11/2001 | Bird ................... G06F 3/04812 715/810 |
| 6,779,021 B1* | 8/2004 | Bates .................. G06Q 10/107 707/999.006 |
| 2007/0043866 A1* | 2/2007 | Garbow ............... G06Q 10/107 709/226 |
| 2012/0185803 A1* | 7/2012 | Wang .................. G06F 3/04817 715/847 |
| 2013/0019203 A1* | 1/2013 | Kotler ................. G06F 3/04812 715/811 |

(Continued)

OTHER PUBLICATIONS

J.J. Darragh, "The Reactive Keyboard: A Predictive Typing Aid," Nov. 1990, IEEE, Computer (vol. 23, Issue: 11, pp. 41-49) (Year: 1990).*

*Primary Examiner* — James T Tsai
(74) *Attorney, Agent, or Firm* — Clayton, McKay & Bailey, PC

(57) ABSTRACT

Examples described herein include systems for generating a predictive action button within a graphical user interface. The system can launch an action generator that tracks a user's behavior, either directly or through the use of an action profile. User behavior can be tracked in individual applications or across multiple applications and devices. Action modules can implement application events and procedures to track particular events and behavior information for that application. A module engine can analyze correlations between the events and behaviors. Based on this analysis, the predictive action button can be displayed for carrying out the predicted action when the corresponding application event occurs.

20 Claims, 6 Drawing Sheets

(56) References Cited

U.S. PATENT DOCUMENTS

| | | | | |
|---|---|---|---|---|
| 2013/0159408 A1* | 6/2013 | Winn | G06N 20/00 | 709/204 |
| 2013/0346347 A1* | 12/2013 | Patterson | G06N 99/005 | 706/12 |
| 2014/0237425 A1* | 8/2014 | Chan | G06F 3/0482 | 715/810 |
| 2014/0359456 A1* | 12/2014 | Thiele | H04W 4/027 | 715/735 |
| 2015/0277702 A1* | 10/2015 | Hardwick | H04M 1/72563 | 715/835 |
| 2016/0019298 A1* | 1/2016 | Brodie | G06F 16/148 | 707/734 |

* cited by examiner

| EMAIL SENDER | % DELETED | AVG. TIME TO DELETE | PROBABILITY OF DELETE |
|---|---|---|---|
| SENDER 1 | 12% | 253 SEC. | 8% |
| SENDER 2 | 85% | 7 SEC. | 65% |

FIG. 4

GENERATING PREDICTIVE ACTION BUTTONS WITHIN A GRAPHICAL USER INTERFACE

RELATED APPLICATIONS

Benefit is claimed under 35 U.S.C. 119(a)-(d) to Foreign Application Serial No. 201641004196 filed in India entitled "GENERATING PREDICTIVE ACTION BUTTONS WITHIN A GRAPHICAL USER INTERFACE", filed on Feb. 5, 2016, by AIRWATCH LLC, which is herein incorporated in its entirety by reference for all purposes.

BACKGROUND

Software applications for computing devices are increasingly powerful and intricate, giving the user more options for manipulating information within those applications. But this increased flexibility has potential drawbacks as well. In particular, it can slow down productivity by overwhelming the user with potential actions and requiring multiple steps to perform tasks.

A standard email application for a mobile device provides a good example. When the user logs in, he or she might have a number of read and unread emails. For the unread emails, the user makes a determination of which action to take, such as deleting, archiving, forwarding, printing, adding to a calendar, attaching to another email, and so on. The user needs to parse the email—or at least its preview—to determine which action to take. Carrying out that action typically requires multiple button presses. The time spent making a determination and carrying out each multi-step action decreases the user's productivity, taking time which could be better spent elsewhere.

Similar inefficiencies also apply to other applications, such as file access/sharing applications, internet browsers, photo viewers, video players, and others. Moreover, these applications can have limited ability to recognize use patterns or probabilities within the application, much less across multiple applications or devices.

For at least these reasons, a need exists for improving application efficiency for users, and in particular, for generating predictive action buttons within a graphical user interface.

SUMMARY

Both the foregoing general description and the following detailed description are exemplary and explanatory only. The claims are not intended to be limited to the descriptions and examples herein.

In one example, a system generates a predictive action button within a graphical user interface. The system can include a non-transitory, computer-readable medium that contains instructions, as well as a processor that executes those instructions to perform various stages. At one stage, the processor can launch an action generator that tracks a user's behavior with respect to at least one application. The "action generator" can be a service component, either on a user device or a server, that performs certain action tracking services described in more detail below.

The action generator can monitor the user's behavior based on an action profile for the user. The "action profile" can include a profile that describes which user behaviors or actions to track in one or more applications. To do this, the action profile can identify at least first and section action modules for use in tracking behavior. In one example, the action modules can include specific tracking criteria for tracking user activities across multiple applications. The action modules can also track aspects of the user's behavior across multiple devices associated with the user when an action generator is installed on or otherwise accessed by each device.

Based on an application event that is captured by the action generator, the system can analyze the tracked behavior data to determine whether to present a predictive action button. An application event can include any event specified in the action profile, such as a new email being received at an email application, or system processes taking up too much memory or processing power. Based on past behavior analysis, the action generator or other system component can generate and display a predictive action button.

To aid in the behavior analysis, the processor can provide the tracked user behavior from the action generator to a module engine. The module engine can identify a probability of at least one potential action of the user based on the tracked user behavior, and compare that probability to a threshold value. The "module engine" can be a service component, either on a user device or a server, that performs services including logic processing and calculations described in more detail below. In one example, the module engine can be server-based to collect user actions that occur across multiple devices associated with a user. This can provide a more accurate assessment of potential user actions.

Based on the probability meeting the threshold value, a predictive action button can be generated and displayed. The predictive action button can include explanatory text and at least one function or procedure call for carrying out the associated action. The processor can also carry out the at least one potential action based on the generated predictive action button.

In some examples, identifying a probability of at least one potential action of the user is accomplished, at least in part, by calculating the probability based at least partially on the action profile. The probability can also be calculated by the module engine at a server that is remote from the action generator. This can allow the module engine to base the probability on actions that occur across multiple different devices associated with the user. The threshold value can be identified based on the user's behavior across multiple applications. Alternatively, the action generator and the module engine can both execute as part of a single application.

In another example, a non-transitory, computer-readable medium is provided that, when executed by a processor, performs various stages for generating a predictive action button within a graphical user interface. At one stage, the processor launches an action generator that tracks a user's behavior with respect to at least one application. The processor can provide the tracked user behavior to a module engine, which can identify a probability of at least one potential action of the user and compares that probability to a threshold value. Based on the probability meeting the threshold value, a predictive action button can be generated and displayed. The processor can also carry out the at least one potential action based on the generated predictive action button.

In yet another example, a method is provided for generating a predictive action button within a graphical user interface. The method can include launching an action generator that tracks a user's behavior with respect to at least one application and providing the tracked user behavior to a module engine. The module engine can identify a probability of at least one potential action of the user and compares the probability to a threshold value. The method further can include generating and displaying the predictive action button based on the probability meeting the threshold value, and carrying out the at least one potential action based on the generated predictive action button.

BRIEF DESCRIPTION OF THE DRAWINGS

FIG. 4 is an exemplary table utilized by an action generator or module engine.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems for generating a predictive action button within a graphical user interface. The system can launch an action generator that tracks a user's behavior, either directly or through the use of an action profile. User behavior can be tracked in individual applications or across multiple applications and devices. For example, a particular application can go through a registration procedure to register an application to the system. Registering the application can include adding at least one action module to an action profile of the action generator. The action modules can include instructions used by the action generator to track user actions with respect to the application. The action generator can receive information regarding user behavior based on exposed hooks in one or more applications. The exposed hooks can be part of an application programming interface ("API") and can be implemented based on the action modules. Data can be collected locally in one or more tables on the user device, or can be sent to a server for storage.

A module engine can interpret the collected data for the subsequent generation of predictive action buttons. To determine whether a predictive action button is appropriate, the action generator or module engine can perform a variety of calculations or other data manipulations. For example, upon receiving an event identified in the action profile, the action generator or module engine can access a table containing information regarding the user's previous patterns with respect to that potential user action, and determine the likelihood of the user taking action. For example, the module engine can be located on a server with greater storage capacity and processing power relative to the user's device. In other examples, the action generator and module engine can be part of the same process, and both can be located on a server that is remote from the user's device. In one example, the utilization of device resources versus server resources can be continuously adjusted based on available bandwidth, system resources, and other considerations.

Figure 1:
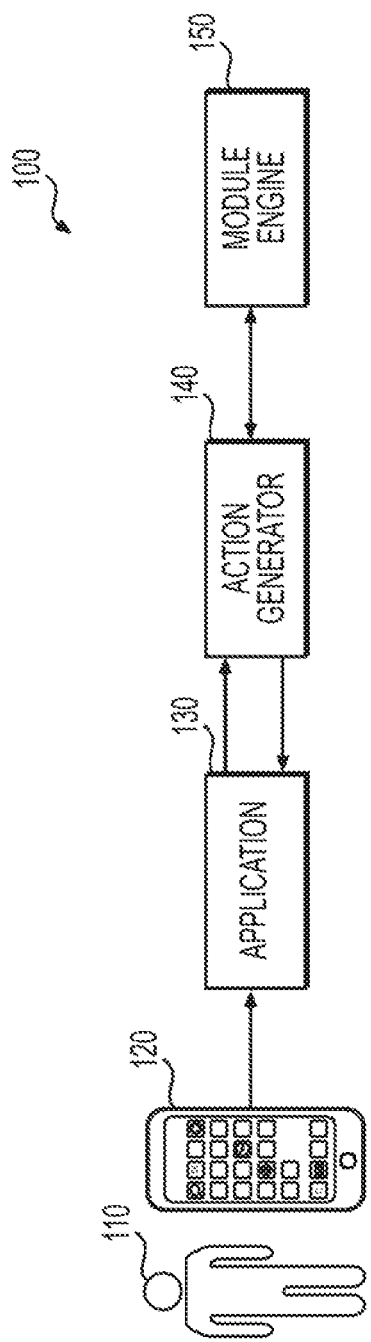
FIG. 1 is an exemplary illustration of system components.
Figure 2:
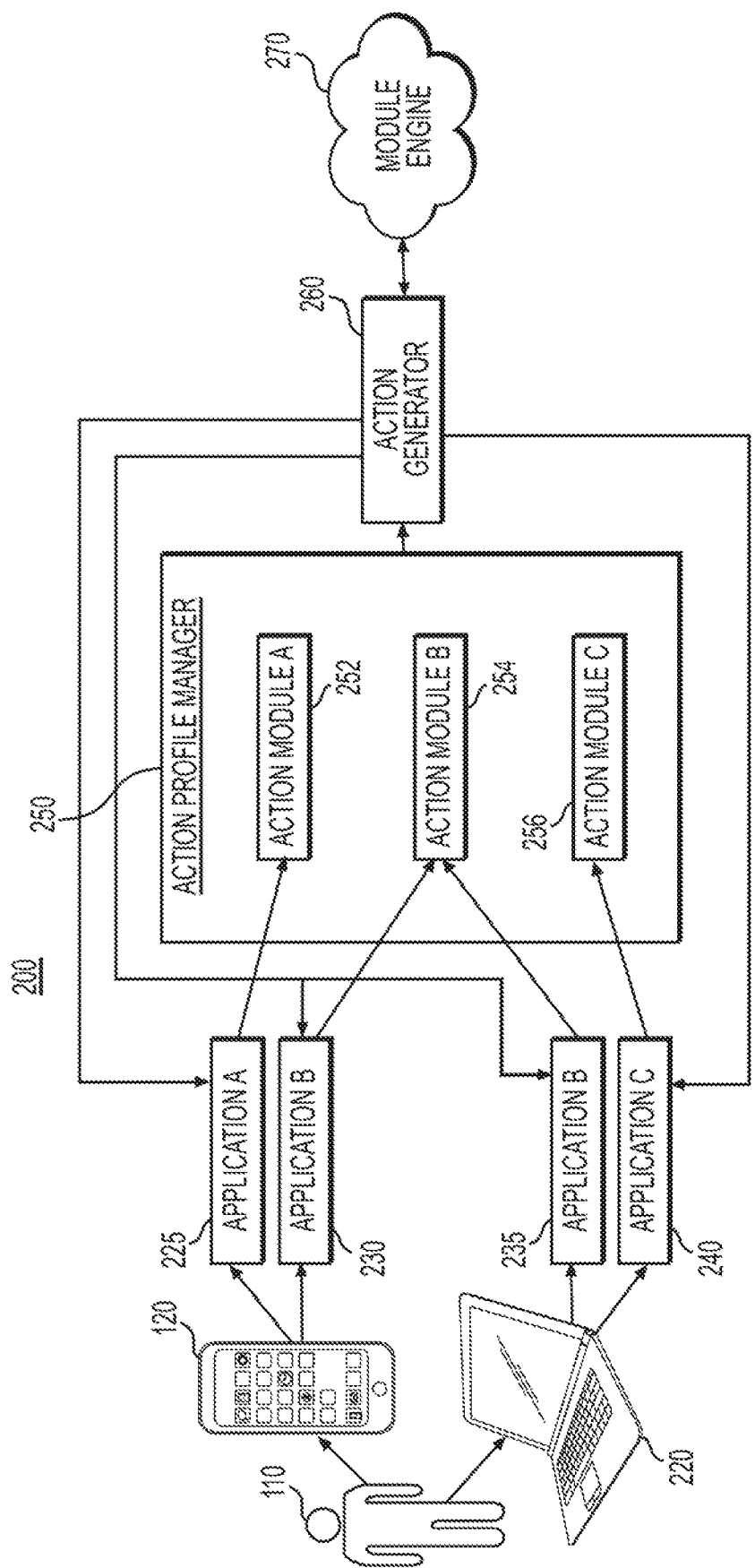
FIG. 2 is another exemplary illustration of system components.
Figure 3:
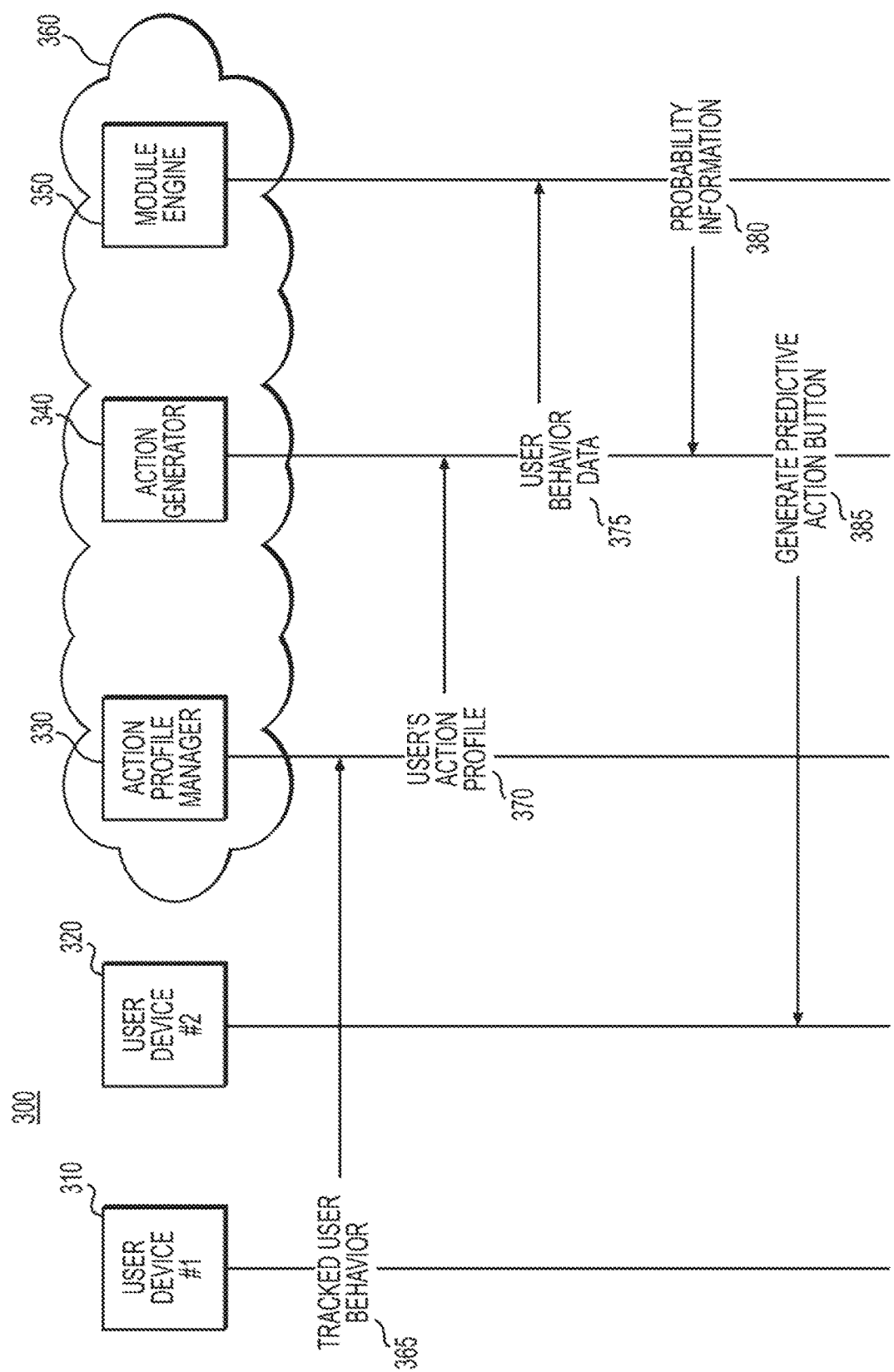
FIG. 3 is a representation of an exemplary method executed in a system.
Figure 5:
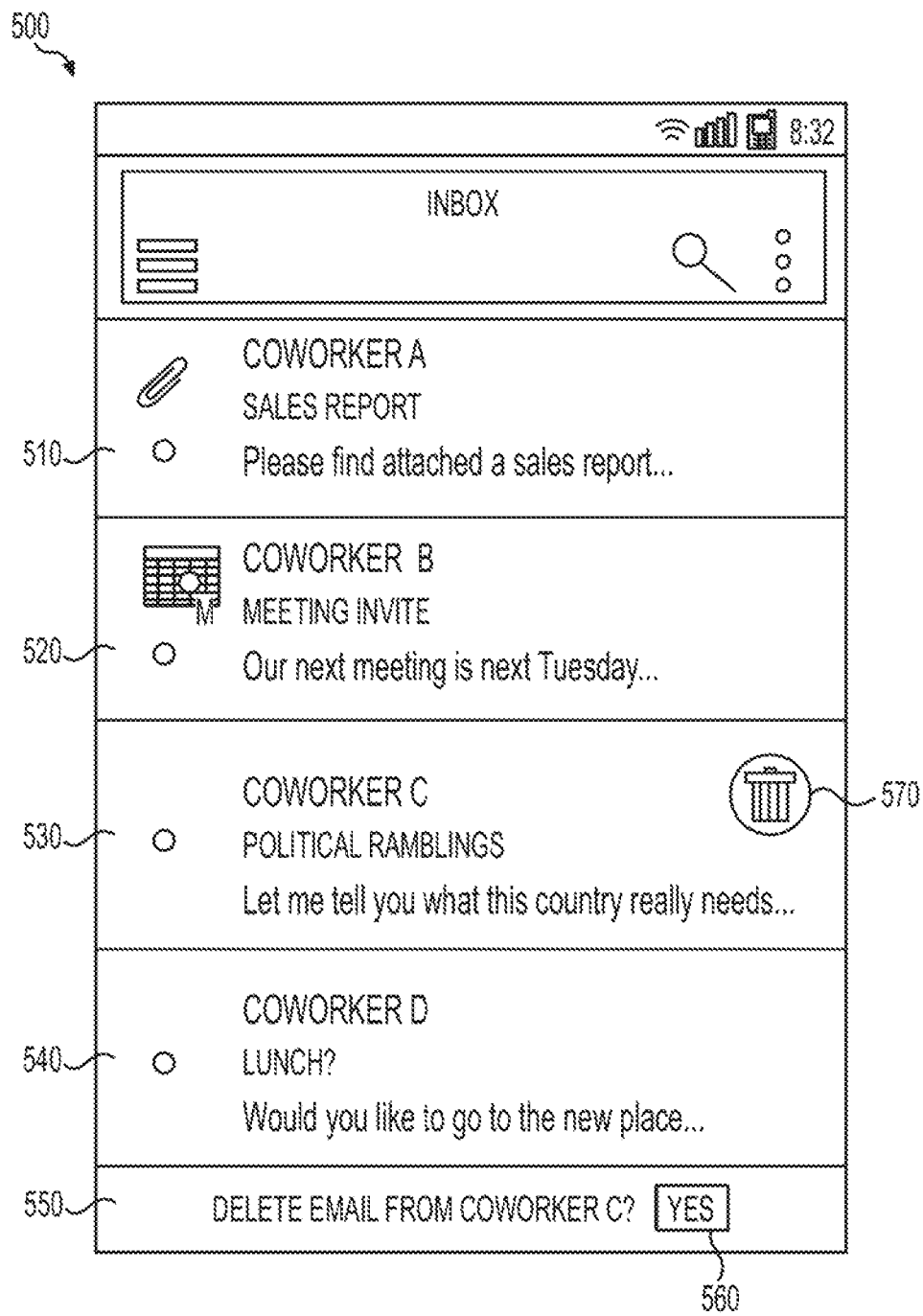
FIG. 5 is an exemplary illustration of a graphical user interface.
Figure 6:
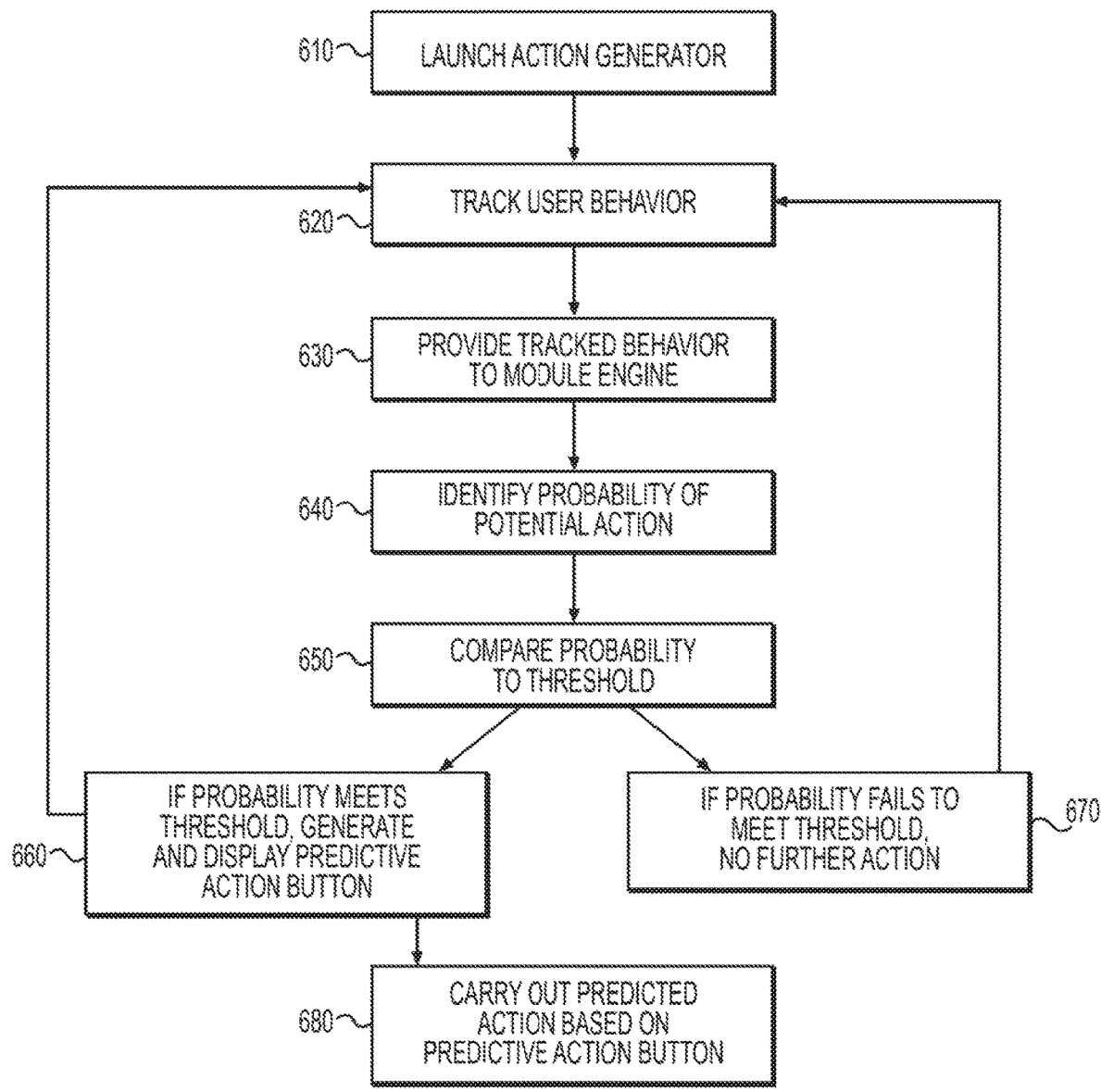
FIG. 6 is a flowchart of an exemplary method executed in a system.

FIGS. 1-3 provide three examples of systems for generating a predictive action button within a graphical user interface. The examples illustrate varying system components and layouts. FIG. 4 provides an example probability table used to make a determination regarding generating a predictive action button. FIG. 5 illustrates an example predictive action button generated within a graphical user interface. Finally, FIG. 6 provides a flowchart of a method for generating a predictive action button.

Turning to FIG. 1, an example system 100 for generating predictive action buttons is illustrated. This example can take advantage of the storage space and processing power of a user's 110 device 120 without resorting to remote servers. Other variations utilizing remote servers are discussed later in this disclosure.

In FIG. 1, the user 110 can access an application 130 on his or her device 120. The device (or "user device") 120 can be any computing device, such as a cell phone, laptop, tablet, personal computer, or workstation. A user device 120 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others.

An action generator 140 can also execute on the user device 120. The action generator 140 can receive information from the application 130 regarding the user's 110 behavior with respect to that application 130.

In some examples, the application 130 is registered with the action generator 140 so that the action generator 140 can monitor events and user 110 behavior at the application 130. The registration process can occur automatically for applications 130 built with this functionality in mind, or can happen manually by the user 110 or an administrative user. For example, the user 110 can allow information sharing with the action generator 140 by turning "on" a predictive action button feature within the application 130 menu. Alternatively, the user 110 can access an approved-application list within an interface relating to the action generator 140, allowing access to the application 130 from there. The registration process can allow a user 110 or administrator to control which application 130 shares data with the action generator 140. The registration process also identifies an application 130 to the action generator 140 for behavior tracking for use in the potential generation of predictive action buttons.

In one example, the user 110 can set limits for behavior tracking based on a variety of considerations such as system resources, battery level, or connectivity status. For example, the user 110 can instruct the application 130 to stop providing information to the action generator 140 if the processor within the device 120 remains at or above 90% capacity for a particular amount of time. As another example, the user 110 can instruct the application 130 to stop providing information to the action generator 140 if the battery level of the device 120 drops below 20%. Of course, these numbers are exemplary only; the user 110 can instruct the application 130 as he or she sees fit.

In one example, the action generator 140 can utilize a module engine 150 to assist with calculations, data storage, pattern recognition, and any other analytical processes needed to determine whether to generate a predictive action button. The module engine 150 can receive behavior information from the action generator 140. In one example, that behavior information can be passed directly (substantially unchanged) through the action generator 140 from the application 130. Alternatively, the behavior information can be generated by the action generator 140 based on information from the application 130. For example, the action generator 140 can parse the raw data received from the application 130 and provide only useful portions of that information to the module engine 150. As another example, the action generator 140 can pass all of the raw information from the application 130 to the module engine 150 while also providing additional information relating to potential predictive action buttons.

Upon receiving the information provided by the action generator 140, the module engine 150 can perform calculations, including comparing, analyzing, and aggregating past user 110 behavior. Although the module engine 150 of FIG. 1 is shown as a local component of the system 100, it can also be provided on a server that is remote from the action generator 140. By locating the module engine 150 on a server, the system 100 can store large amounts of data without using storage space on the device 120. A server-based module engine 150 can also perform more processor-intense calculations than the device 120 might be capable of alone. Additionally, the server-based module engine 150 can analyze behavior information from multiple different user devices 120 associated with a single user 110 in an example.

The module engine 150 can include multiple engine types for different analysis tasks in one example. For example, a computation engine can calculate probabilities, regressions, and co-relations. A text processing engine can recognize text. An extraction engine can manipulate metadata and other elements within files. Video and image processing engines can match visual data within video and image files.

These engines of the module engine 150 can process the behavior data into usable results for generating a predictive action button. In one example, the action generator 140 can generate a predictive action button based on comparing an application 130 event to previously-determined predictive behavior rules. A predictive behavior rule can be created when the module engine 150 recognizes that a particular user action occurs a threshold percentage of the time over a pre-determined set of prior behavior information related to the event. The action generator 140 can keep a local set of predictive behavior rules to which application 130 events are compared.

In one example, predictive behavior rules can identify an application 130 event and an action to take in response to the event. The identified action can include displaying a predictive action button with particular text for consideration by the user 110. In another example, a predictive behavior rule can identify an application 130 event and a probability of a type of user action occurring. Under this approach, the action generator 140 can compare the probability against a threshold in the action profile to determine whether to display a predictive action button. Upon receipt of an event corresponding to the predictive behavior rule, the action generator 140 can compare the associated threshold against information in the action profile to determine whether to act on an event.

For example, the system 100 can create a predictive action rule by determining that a threshold percentage of emails from a particular sender are deleted by the user 110 without being read. Based on this determination, a predictive behavior rule can be created and stored locally on the user device 120 for use by the action generator 140. The event for this predictive behavior rule can include receiving an email from the particular sender. The predictive behavior rule can associate that event with a percentage likelihood of deletion, or can specify that a particular action should be taken. When an email is received in the application 130 from the particular sender, the action generator 140 matches this event against the predictive behavior rule. Based on the match, the action generator 140 can perform an associated action of presenting a predictive action button that asks whether the user would like to delete the email. The predictive action button for deleting the email can be displayed automatically when the email arrives or once a user selects the email.

In this way, the local predictive behavior rules can allow the action generator 140 to determine the need for a predictive action button without first contacting the module engine 150. In that case, the action generator 140 can generate a predictive action button and instruct the application 130 to display the predictive action button. Displaying the predictive action button is discussed in more detail with respect to FIG. 5.

In one example, the action generator 140 can communicate with the module engine 150 over a network. The network can be an enterprise network in one example. The network can include the Internet, a local area network, or any other suitable communication platform. The action generator 140 executing on the user device 120 can communicate with a module engine 150 on a server over the network using one or more modulators, demodulators, multiplexers, demultiplexers, network communication devices, wireless devices, antennas, modems, and any other type of device configured to enable data communication through a communication network.

FIG. 2 provides an example system 200 for generating predictive action buttons. This system 200 features additional components and user devices relative to the system 100 of FIG. 1. For example, the system 200 of FIG. 2 shows a single user 110 having two user devices 120, including a smartphone 120 and a laptop 220. Although two devices 120, 220 are shown, any number and combination of devices can be used. For example, the user 110 can have multiple devices, such as smartphones, tablets, laptops, and desktop computers. In FIG. 2, each device 120, 220 is running at least two applications. The mobile device 120 is running Application A 225 and Application B 230, while the laptop 220 is running a different instance of Application B 235 along with Application C 240.

As in FIG. 1, the applications 225, 230, 235, 240 provide information to the action generator 260. However, in this example the action generator 260 utilizes an action profile manager 250 to assist in coordinating behavior analysis between the two devices 120, 220. The action profile manager 250 can be a separate process from the action generator 260, or can be a subassembly or process within the action generator 260. The ability to separate the functionality of the action profile manager 250 and action generator 260 can provide additional flexibility for the overall system 200. For example, the action profile manager 250 can be located on one of both devices 120, 220 while the action generator 260 is located elsewhere, such as on a server or on a different device. In another example, the action profile manager 250 can be located within the action generator 260 or simply located on the same device or server as the action generator 260.

The action profile manager 250 can include action modules 252, 254, 256 that relate to particular applications 225, 230, 235, 240. In the example of FIG. 2, action module A 252 is associated with Application A 225, action module B 254 is associated with Application B 230, 235, and action module C 256 is associated with Application C 240. The action profile manager 250 can simultaneously collect information from Applications A-C 225, 230, 235, 240. In the case of an application being used by more than one device, such as Application B 230, 235 in FIG. 2, the respective action module B 254 receives information from both instances of the application and sorts the information accordingly.

The action modules 252, 254, 256 can implement hooks, such as API procedure calls, in the respective applications 225, 230, 235, 240 to monitor events that take place in those applications 225, 230, 235, 240. The action modules 252, 254, 256 also can implement API events in the respective applications 225, 230, 235, 240 to cause the action profile manager 250 or action generator 260 to be contacted when one of the implemented events occurs. The information types sent to the action generator 260 can be specified by action module's 252, 254, 256 implementation of the API procedures or events.

As an example, an email application 225 can have API events for received emails and deletion actions. By implementing the API event for received emails, the email application 225 can contact the action generator 260 when an email is received and the implemented event is triggered. The email application 225 can send specific information regarding the received email based on the implementation details of the action module 252. Example information can include an email identifier (to distinguish the email from others in the email application 225), a sender email address, a subject line, or other email-related information. Similarly, when a user deletes an email within the email application 225, the implemented deletion API event can cause the application 225 to send specific information regarding the deletion. This information can include the email identifier, a deletion time, a read status of the email, and other information. This information collected at the action generator 260 can be sent to the module engine 270 for processing and generation of predictive behavior rules in one example.

In still another example, the action generator 260 and one or more of applications 225, 230, 235, 240 can be managed applications. Managed applications can communicate with the action generator 260 through use of a management component that can execute on the user devices 120, 220. The management component can provide the action generator 260 with backdoor access to the applications 225, 230, 235, 240. The management component can include a device-level component, such as an API, agent application, hypervisor, or virtualized device, and an application-level component, such as an API, software development kit ("SDK"), application wrapper, or workspace agent application.

Using the management component or implemented API procedures, the action generator 260 can search text, metadata, and tags for content generated or stored in other managed applications 225, 230, 235, 240 through use of the management component. The management component can also allow a management server to access tags and metadata in the managed applications 225, 230, 235, 240. Therefore, a server-based action generator 260 or module engine 270 can access data at a managed application 225, 230, 235, or 240 that executes on one or more user devices 120, 220.

Tag information can include metadata that identifies features of various types of content items. Tags can be applied to documents when they are created or edited, and can be used to gather relevant information about the content item. Example tags can include document authors, senders, recipients, and editors. Other tags can include a title, keywords, a location, or a date. Tags can be assigned to link common documents, emails, or recurring meetings. For example, different document versions can include a common document tag. Recurring or rescheduled meetings can include a common meeting tag. Emails that are part of a thread can similarly include a common tag. The tags can be used by the module engine 270 to analyze behaviors and events across items that can be related to one another (based on common tags).

In one example, the action profile manager 250 can provide information, such as tags or other metadata, from the various applications 225, 230, 235, 240 to the action generator 260 in a format specified by an action profile. The action profile can describe which data and which format to use for a set of behavior information collected from the applications 225, 230, 235, 240. The action profile manager 250 can format and package the information accordingly for consumption by the action generator 260. For example, the action profile manager 250 can provide raw data regarding the user's 110 interaction with one or more of the applications 225, 230, 235, 240. However, the action profile manager 250 might need to reformat some raw data as specified by the action profile so that the data can be understood and used by the action generator 260 or module engine 270. In this case, the action profile manager 250 can format and send the data to the action generator 260.

After receiving the relevant information from the action profile manager 250, the action generator 260 can determine whether to generate and display a predictive action button. In some examples, this determination is made by providing the tracked user behavior to a module engine 270. In other examples, the determination is made by the action generator 260 without further input from the module engine 270, such as by comparing against stored predictive action rules. In yet other examples, the module engine 270 is part of the action generator 260. For example, the module engine 270 can be a subassembly or module within the action generator 260.

In the example of FIG. 2, the module engine 270 can execute separately from the action generator 260, and can be located on a server that is remote from the action generator 260. The information provided to the module engine 270 from the action generator 260 can take a variety of forms. In one example, the action generator 260 can provide information directly from the action profile manager 250 to the module engine 270 without any substantive changes. Alternatively, the action generator 260 can send only a portion of the information received from the action profile manager 250. The action generator 260 can also generate additional information that assists the module engine 270 with calculations, pattern recognition, or any other analytical processes to be performed.

The module engine 270 can receive information from the action generator 260 and store it, at least temporarily, for further analysis. By locating the module engine 270 on a remote server, as shown in FIG. 2, the module engine 270 can compare behavior information from multiple devices 120, and, in one example, even multiple users. The module engine 270 can analyze stored data by, for example, recognizing patterns of user 110 behavior, determining differences between user 110 behavior across different applications, determining differences between user 110 behavior within a single application across multiple devices, and calculating action probabilities on a per-application, per-device basis.

Relevant results of the calculations performed by the module engine 270 can be provided to the action generator 260. The results can be in the form of predictive behavior rules in one example. The results can also include, for example, a recommendation on whether the action generator 260 should generate a predictive action button.

In some examples, the action generator 260 makes the determination of whether a predictive action button should be generated. This can be based on comparing a precalculated threshold likelihood associated with an event to a rule within the action generator 260, such as within an action module 252, 254, 256. Alternatively, the action generator 260 can request specific types of analyses or recommendations from the module engine 270 in response to an application 225, 230, 235, 240 event. For example, when an email is received at the email application 225, the action generator 260 can request a calculated probability of the user 110 deleting the email without opening. In that example, the action generator 260 can receive the requested probability from the module engine 270 and determine whether to generate a predictive action button. In another example, the action generator 260 can request a recommendation regarding whether to generate a predictive action button. In that example, the module engine 270 would not only generate a probability but also use that probability to make a recommendation—for example, by comparing that probability to a table stored within the module engine 270.

Based on information received from the action profile manager 250, and optionally from the module engine 270 as well, the action generator 260 can determine whether to generate and display a predictive action button. In FIG. 2, the action generator 260 sends instructions for generating and displaying a predictive action button to Applications A-C 225, 230, 235, 240. The action generator 260 is capable of sending such instructions to multiple instances of an application running on multiple devices 120, 220, such as Application B 230, 235.

When the user selects the predictive action button, an associated function can be carried out in one of the applications 225, 230, 235, 240. This can include calling an API process, such as a process to delete an email in the email application 225. In another example, a common management component between the application 225 and the action generator 260 is used to execute the function at the application 225.

While the examples discussed thus far have shown at least one of the action profile manager 250, action generator 260, or module engine 270 executed locally—for example, on the user's device rather than on a remote server—all of these components can execute on one or more remote servers. This type of system can minimize the computational load on the user's devices by passing that load to remote system components. For example, API events and procedure calls of applications 225, 230, 235, 240 can be implemented to call a remote server where the action profile manager 250, action generator 260, or module engine 270 executes.

FIG. 3 provides an illustration of an example method 300 performed in an example system. In this method, a first user device 310 and second user device 320 can utilize an action profile manager 330, action generator 340, and module engine 350. One or more of the action profile manager 330, action generator 340, and module engine 350 can be remote from either the first or second user devices 310, 320. These remote components can execute in the cloud 360, which can include a single server, a network of servers, or a network of any other types of devices or processors external to the first and second user devices 310, 320.

At stage 365, the first user device 310 can provide tracked user behavior to the action profile manager 330. The tracked user behavior can be raw data regarding the user's actions in one or more applications, or can be data tailored for further use by the action profile manager 330 or action generator 340. Although the example of FIG. 3 shows the tracked user behavior provided to the action profile manager 330 at stage 365, it can alternatively be provided directly to the action generator 340.

If the tracked user behavior is provided to the action profile manager 330 as shown in FIG. 3, then at stage 370 the action profile manager 330 can provide the user's action profile to the action generator 340. The user's action profile can be provided to the action generator 340 in various formats. For example, the user's action profile can be identical to the tracked user behavior from stage 365, or can be formatted, truncated, or otherwise modified in a manner that provides the action generator 340 with relevant data while omitting irrelevant data. As discussed with respect to FIG. 2, the user's action profile can organize and categorize tracked user behavior across multiple applications and devices.

At stage 375, the action generator 340 can provide user behavior data to the module engine 350. The user behavior data can contain information similar to the user's action profile from stage 370, or can merely include information necessary for the module engine 350 to perform a particular calculation. The module engine 350 subsequently analyzes the user behavior data provided by the action generator 340. The module engine 350 can share a server location with the action generator 340 or action profile manager 330, or can be located on a server that is remote from either the action generator 340 or action profile manager 330. In either case, the module engine 350 can perform any analysis or calculation requested by the action generator 340.

At stage 380, the results of those analyses or calculations can be provided to the action generator 340 as probability information. In one example, the results are in the format of one or more predictive behavior rules that connect an event to a corresponding behavior probability. In another example, the predictive behavior rules can connect an event to an action to be performed by the action generator.

At stage 385, the action generator 340 can determine, based at least in part on the probability information (such as predictive behavior rules) provided by the module engine 350, whether to generate a predictive action button. The action generator 340 can also determine which user device 310, 320 should receive the predictive action button based on which user device 310, 320 has received an event. For example, the tracked user behavior of stage 365 originates from a first user device 310, but based on an event at the second user device 320, the action generator 340 can send instructions to the second user device 320 to generate and display a predictive action button. The second user device 320 can display the predictive action button on the graphical user interface (GUI) of that device 320.

This action can be useful in a situation where a user is performing tasks on a first device—for example, checking and deleting emails on a laptop computer—and later uses a second device to perform a similar task. The action generator 340 can provide a seamless transition between the two devices 310, 320, generating predictive action buttons on either device as appropriate. Of course, the action generator 340 can receive tracked user behavior from any number of user devices. The action generator 340 can analyze overall user behavior based on the user's interactions with all relevant devices, but can also recognize patterns on particular devices. For example, the action generator 340 can determine that a particular user is more likely to delete work email using a laptop versus a smartphone, and can generate predictive action buttons accordingly.

FIG. 4 provides a representative example of a table 400 utilized by either an action generator 260, module engine 270, or both, to determine the probability of an event occurring. In this particular example, the table 400 is used to determine the probability of a particular email being deleted.

In the table 400, an email-sender column 410 stores information regarding email senders. In this example, the email-sender column 410 contains two distinct senders. In practice, the email-sender column 410 will likely contain many senders. There is no limit to the number of senders that can be stored in the email-sender column 410.

In the percentage-deleted column 420, historical statistics are generated, stored, or recalled. The numbers in the percentage-deleted column 420 represent the overall percentage of emails from a particular sender that were deleted by the user. Although not shown here, the table 400 can include more granular information regarding deletion statistics. For example, a separate column can provide deletion statistics that parse additional factors such as: deletions within a particular time frame, deletions of original emails, deletions of reply emails, and deletions of forwarded emails.

In FIG. 4, the table 400 also includes an average-time-to-delete column 430, representing the average amount of time between when an email is viewed and when it is deleted. Additional variations of this information can include, for example, average time after an email is opened, percentage of emails from a sender that are deleted without opening, and so on. The table 400 can also include columns with predicted values, such as the probability-of-deletion column 440. The probability-of-deletion column 440 provides a calculated probability that a particular email will be deleted without opening. The table 400 could additionally, or alternatively, provide columns with other calculations or predicted values. For example, the table 400 can provide the probability of an email being forwarded to a particular individual or saved to a folder.

In some examples, the table 400 is managed by the action generator 260. For example, the action generator 260 can store the table 400 in a storage location accessible by the action generator 260. The action generator 260 can perform probability calculations if it determines that adequate system resources are available. Otherwise, the action generator 260 can send a request to the module engine 270 for a particular calculation. The module engine 270 returns the calculation and the action generator 260 incorporates it into the table 400.

In other examples, the table 400 is managed by the module engine 270. This can be useful if the table itself is large, or is based on a large dataset. It can also be useful in examples where the action generator 260 is located on a user device or other storage area with limited resources, while the module engine 270 is located on a remote server with greater resources and processing power.

Other types of tables can be created, stored, and modified by either the action generator 260 or module engine 270. In some examples, a separate table is created for each predictive action rule or predictive action button. For example, in addition to the table 400 of FIG. 4, a second table can be used for determining a whether to generate a different predictive action button. There is no limit to the number of tables or predictive action buttons that can be included in the system. Some examples of other types of predictive actions include: downloading an email attachment, summarizing an email, creating a calendar meeting, setting reminders, signing a document, and asking a user if they want to kill a processor-intensive process, among others. These predictive actions can include one or more predictive action rules associated with generation of a predictive action button.

FIG. 5 shows an example GUI 500 of a user device. The GUI 500 of FIG. 5 is displaying four emails 510, 520, 530, 540 from four respective coworkers (A-D). In this example, the system for generating a predictive action button has predicted that the user is likely to delete the email 530 from coworker C. As a result, the system has displayed a first predictive action button 570 in a location associated with that email 530. The system also provides a verbal notification 550 on the GUI 500, asking the user if he or she would like to perform that particular predicted action. Along with the verbal notification 550, a second predictive action button 560 is provided for the user to select. In this example, the first and second predictive action buttons 560, 570 perform the same action when selected. That is, both buttons delete the unwanted email 530.

In some examples, after the user performs the predicted action by selecting a predictive action button 560, 570, the GUI 500 displays an action confirmation. The action confirmation can replace the text of the verbal notification 550 on the GUI 500 and provide the user with an explanation of what action was taken. For example, the action confirmation might state "Email from Coworker C deleted." Along with the action confirmation, an undo button can be provided on the GUI 500. The undo button can be associated with the action confirmation; for example, it can replace the predictive action button 560 shown in FIG. 5. Additionally, an undo button can be provided elsewhere on the screen. The action confirmation and associated undo functionality allows a user to review what action was taken and reverse that action if desired.

FIG. 6 provides a flowchart of an example method of generating a predictive action button. At step 610 of the method, the action generator 260 is launched. This can occur when an application 225 is registered with the action generator 260. If the application 225 is already registered with the action generator 260, the action generator 260 can launch when that application 225 is launched. Alternatively, the action generator 260 can launch when the user device 120 is powered on. If the action generator 260 is located on a remote server, it can launch when the user device 120 is powered on and connects to the action generator 260 over a network.

At step 620, the system tracks user behavior. This can include tracking some or all actions taken within a particular application 225, including button presses, text entry, and any other actions allowed within that application 225. The type of actions tracked can be governed by one or more action modules and API implementation at the application 225. Tracked user behavior is provided to the module engine 270 at step 630. This step does not require all of the tracked user behavior from step 620 to be provided to the module engine 270. Instead, a relevant portion of that data can be provided. Of course, all of the user behavior data from step 620 can be provided if the system determines that it would be useful.

At step 640, the probability of a potential action is identified. This identification can occur any number of different ways, including extrapolating historical data, parsing text passages, correlating behavior across different applications 225, 230, 235, 240, or any other methodology supported by the system. One or more predictive action rules can be generated based on the probability.

At step 650, the identified probability is compared to a threshold. The threshold can be set by the system and modified over time. For example, the system can monitor a user's history of choosing to utilize (or not utilize) a predictive action button that has been generated based on a particular data set. The user's past reactions to a predictive action button can inform the system of adjustments needed for setting the threshold value.

If the probability identified at step 640 meets the threshold at step 650, the system proceeds to step 660. At step 660 the system generates and displays one or more predictive action buttons. An example of how these buttons can be displayed is provided in FIG. 5. On the other hand, if the identified probability does not meet the threshold, then the system proceeds to step 670 and does not generate a predictive action button. In that scenario, the system continues tracking user behavior at step 620 and proceeds through the flowchart again from there.

In the event that a predictive action button is generated and displayed at step 660, the system can proceed to step 680. At step 680, the predicted action is carried out in response to the user selecting the displayed predictive action button. Regardless of whether the user selects the displayed predictive action button, the system can continue tracking the user's behavior at step 620. In this sense, the system can constantly monitor the user's behavior and adapt over time, even after displaying a predictive action button.

The examples described above generally relate to systems for generating predictive action buttons for use with an email application. However, systems disclosed herein can include additional functionality beyond email. Examples of some of those additional functions are described below.

In one example, the predictive action buttons provide text summarization functionality. To provide this functionality, the action generator 260 can parse the text of a document, email, SMS, MMS, or other body of text. In some cases, the module engine 270 (rather than the action generator 260) parses the text. Based on the parsed text, the action generator 260 can provide the functionality to generate and display a number of predictive action buttons. For example, it can display a predictive action button that provides a short summary of the body of text, pulling the most relevant portions of the text into a streamlined and coherent collection of text. As another example, the action generator 260 can display a predictive action button that, if selected, provides a summary of an entire email chain. For example, the summary can state that "Kate suggested submitting the current proposal. Bob agrees. Joe does not think it is ready yet." The summary itself can be provided in a pop-up window within the application 225. It can include a back button to return to the application 225, as well as other short-cut buttons that can be relevant based on the parsed text (replying to the email chain or forwarding the email chain).

In another example, a predictive action button provides the user with an option to apportion device resources in a strategic manner. Users commonly multitask with their devices, and when the devices resources become strained, all of the concurrent process can suffer. A relevant example would be streaming music while downloading an attachment from a work email. The user's Internet or cellular connection might not be able to accomplish both of these tasks in an acceptable manner. In that instance, the action generator 260 can generate and display a predictive action button that allows a user to pause, cancel, or prioritize the concurrent tasks. For example, the predictive action button can prompt the user to pause the music streaming until the document is downloaded. In a similar example, the predictive action button can be used to pause or cancel background processes to provide additional memory and processing power for performing a different task. The action generator 260 or module engine 270 can track user behavior to determine which tasks are more important or urgent for the user and provide the predictive action button as appropriate.

In yet another example, a predictive action button provides enhanced document management to the user. The process of saving, downloading, moving, printing, or otherwise managing documents typically involves multiple steps. For example, to save an email attachment a user generally needs to select the attachment to download, navigate to the appropriate folder, and then save the document. To shortcut this process, the action generator 260 can generate and display a predictive action button that accomplishes these tasks with a single button press. The action generator 260 or module engine 270 can parse the attachment and analyze past user behavior for similar documents, emails, senders, or other factors to determine the user's most likely course of action. In some examples the action generator 260 can generate and display multiple predictive action buttons. For example, if a user typically downloads all email attachments to one of two folders, the action generator 260 can provide a predictive action button for downloading an attachment to the respective folder.

In another example, a predictive action button provides the user with an option to schedule a meeting or add an appointment to their calendar. To accomplish this, the action generator 260 parses the content of an email, document, SMS, MMS, or other message to determine potential meetings or appointments. The action generator 260 or module engine 270 can also analyze past user behavior in similar situations to determine a likely action from the user. For example, the action generator 260 or module engine 270 can determine that a user always schedules a meeting with a boss. When that boss emails the user with a proposed meeting time, the action generator 260 provides a predictive action button that inputs the meeting into a calendar and sends a meeting invitation back to the employee's boss.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for generating a predictive action button within a graphical user interface, the system comprising:
   a non-transitory, computer-readable medium that contains instructions;
   a processor that executes the instructions to perform stages including:
      tracking a user's behavior with respect to at least two applications, wherein each of the two applications executes on a different physical device associated with the user;
      aggregating the tracked behavior from the at least two applications at an action profile manager executing on a first of the different physical devices;
      reformatting the tracked behavior by the action profile manager according to instructions specified by an action profile stored at the first of the different physical devices;
      transmitting the reformatted tracked behavior from the first of the different physical devices to a server remote from the different physical devices;

based on the reformatted tracked behavior with respect to the at least two applications, identifying a probability of at least one potential action of the user;

analyzing the reformatted tracked behavior based on the user's interactions with the different physical devices;

determining, based on the analyzing, a likelihood of the at least one potential action of the user on each of the physical devices;

based on the probability meeting a threshold value, generating and displaying the predictive action button on a subset of the physical devices based on the determined likelihood of the at least one potential action exceeding a likelihood threshold, wherein the predictive action button relates to the at least one potential action of the user; and carrying out the at least one potential action based on the user selecting the generated predictive action button.

2. The system of claim 1, wherein tracking the user's behavior further comprises monitoring the user's behavior based on the action profile for the user.

3. The system of claim 2, wherein identifying a probability of at least one potential action of the user comprises calculating said probability based, at least partially, on the action profile.

4. The system of claim 1, wherein the predictive action button is displayed within an email application, proximate a particular email, and wherein carrying out the at least one potential action comprises causing the email application to delete only the particular email.

5. The system of claim 1, wherein identifying the probability is performed at a server that is remote from the graphical user interface.

6. The system of claim 1, wherein tracking and identifying the probability are performed by a single application.

7. The system of claim 1, wherein identifying the probability is based on a historical average time for performing the action of the user.

8. A non-transitory, computer-readable medium containing instructions that, when executed by a processor, performs stages for generating a predictive action button within a graphical user interface, the stages comprising:

tracking a user's behavior with respect to at least two applications, wherein each of the two applications executes on a different physical device associated with the user;

aggregating the tracked behavior from the at least two applications at an action profile manager executing on a first of the different physical devices;

reformatting the tracked behavior by the action profile manager according to instructions specified by an action profile stored at the first of the different physical devices;

transmitting the reformatted tracked behavior from the first of the different physical devices to a server remote from the different physical devices;

based on the reformatted tracked behavior with respect to the at least two applications, identifying a probability of at least one potential action of the user;

analyzing the reformatted tracked behavior based on the user's interactions with the different physical devices;

determining, based on the analyzing, a likelihood of the at least one potential action of the user on each of the physical devices;

based on the probability meeting a threshold value, generating and displaying the predictive action button on a subset of the physical devices based on the determined likelihood of the at least one potential action exceeding a likelihood threshold, wherein the predictive action button relates to the at least one potential action of the user; and carrying out the at least one potential action based on the user selecting the generated predictive action button.

9. The non-transitory, computer-readable medium of claim 8, wherein tracking the user's behavior further comprises monitoring the user's behavior based on the action profile for the user.

10. The non-transitory, computer-readable medium of claim 9, wherein identifying a probability of at least one potential action of the user comprises calculating said probability based, at least partially, on the action profile.

11. The non-transitory, computer-readable medium of claim 8, wherein the predictive action button is displayed within an email application, proximate a particular email, and wherein carrying out the at least one potential action comprises causing the email application to delete only the particular email.

12. The non-transitory, computer-readable medium of claim 8, wherein identifying the probability is performed at a server that is remote from the graphical user interface.

13. The non-transitory, computer-readable medium of claim 8, wherein tracking and identifying the probability are performed by a single application.

14. The non-transitory, computer-readable medium of claim 8, wherein identifying the probability is based on a historical average time for performing the action of the user.

15. A method for generating a predictive action button within a graphical user interface, comprising:

tracking a user's behavior with respect to at least two applications, wherein each of the two applications executes on a different physical device associated with the user;

aggregating the tracked behavior from the at least two applications at an action profile manager executing on a first of the different physical devices;

reformatting the tracked behavior by the action profile manager according to instructions specified by an action profile stored at the first of the different physical devices;

transmitting the reformatted tracked behavior from the first of the different physical devices to a server remote from the different physical devices;

based on the reformatted tracked behavior with respect to the at least two applications, identifying a probability of at least one potential action of the user;

analyzing the reformatted tracked behavior based on the user's interactions with the different physical devices;

determining, based on the analyzing, a likelihood of the at least one potential action of the user on each of the physical devices;

based on the probability meeting a threshold value, generating and displaying the predictive action button on a subset of the physical devices based on the determined likelihood of the at least one potential action exceeding a likelihood threshold, wherein the predictive action button relates to the at least one potential action of the user; and carrying out the at least one potential action based on the user selecting the generated predictive action button.

16. The method of claim 15, wherein tracking the user's behavior further comprises monitoring the user's behavior based on the action profile for the user.

17. The method of claim 16, wherein identifying a probability of at least one potential action of the user comprises calculating said probability based, at least partially, on the action profile.

18. The method of claim 15, wherein the predictive action button is displayed within an email application, proximate a particular email, and wherein carrying out the at least one potential action comprises causing the email application to delete only the particular email.

19. The method of claim 15, wherein identifying the probability is performed at a server that is remote from the graphical user interface.

20. The method of claim 15, wherein tracking and identifying the probability are performed by a single application.

\* \* \* \* \*